United States Patent
Gilmore et al.

(10) Patent No.: US 6,823,985 B2
(45) Date of Patent: *Nov. 30, 2004

(54) EXTENDABLE TRAILER LOADER/UNLOADER WITH USER INTERFACE SECTION

(75) Inventors: Phillip J. Gilmore, Healdsburg, CA (US); John I. McCort, Napa, CA (US); Richard J. Micheletti, Sebastopol, CA (US); Ernie A. Romeo, Healdsburg, CA (US); Ricardo N. Schiesser, Grandville, MI (US); Jesse Eugene Cornwell, Santa Rosa, CA (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 313 days.

This patent is subject to a terminal disclaimer.

(21) Appl. No.: 09/805,202

(22) Filed: Mar. 12, 2001

(65) Prior Publication Data

US 2001/0009217 A1 Jul. 26, 2001

Related U.S. Application Data

(63) Continuation of application No. 09/386,196, filed on Aug. 30, 1999, which is a continuation of application No. 08/800,136, filed on Feb. 13, 1997, now Pat. No. 6,006,893.
(60) Provisional application No. 60/016,141, filed on Apr. 24, 1996.

(51) Int. Cl.$^7$ .............................................. B65G 15/26
(52) U.S. Cl. ...................................... 198/588; 198/594
(58) Field of Search .............................. 198/588, 594

(56) References Cited

U.S. PATENT DOCUMENTS 2,287,230 A 6/1942 Cartlidge (List continued on next page.)

FOREIGN PATENT DOCUMENTS

| AU | 715164 | 5/2000 |
|---|---|---|
| DE | 1481347 | 7/1969 |
| EP | 0904244 B1 | 6/2001 |
| FR | 1361570 | 12/1964 |
| FR | 2525570 | 10/1983 |
| GB | 891147 | 3/1962 |
| GB | 2200613 A | 8/1988 |

OTHER PUBLICATIONS

Product brochure entitled "Expand–O–Conveyor," published in 1953 by Oliver Farquhar Conveyors.
Product brochure entitled "Telescopic Belt Loader," published by Calijan, date unknown.

(List continued on next page.)

*Primary Examiner*—Steven B. McAllister
(74) *Attorney, Agent, or Firm*—Van Dyke, Gardner, Linn & Burkhart, LLP (57) ABSTRACT

An extendable conveyor has an extendable conveyor section supported in a cantilevered manner including at least one extendable conveyor unit that is extendable between an extended position and a retracted position nested within the extendable conveyor section. The conveyor further includes a user interface section supported in a cantilevered manner from the extendable conveyor unit.

39 Claims, 9 Drawing Sheets

U.S. PATENT DOCUMENTS

| | | | |
|---|---|---|---|
| 2,558,629 A | 6/1951 | Smida | |
| 2,812,867 A | 11/1957 | Anderson | |
| 2,971,631 A | 6/1961 | Gray | |
| 3,504,782 A | 4/1970 | Slagle et al. | |
| 3,581,874 A | 6/1971 | Keith | |
| 3,596,785 A | 8/1971 | Weatherford, Jr. | |
| 3,651,963 A | 3/1972 | McWilliams | |
| 3,717,263 A | 2/1973 | McWilliams | |
| 3,752,296 A | 8/1973 | Peterson | |
| 3,788,452 A | 1/1974 | McWilliams | 198/139 |
| 3,819,068 A * | 6/1974 | Weir | 198/588 |
| 3,827,585 A | 8/1974 | McWilliams | |
| 3,835,980 A | 9/1974 | Brooks, Jr. | 198/139 |
| 3,866,768 A | 2/1975 | Weir | |
| 3,885,682 A * | 5/1975 | McWilliams | 198/588 |
| 3,931,897 A | 1/1976 | Bacon et al. | |
| 3,982,625 A | 9/1976 | Wentz et al. | |
| 3,993,204 A | 11/1976 | Hummel | |
| 4,281,955 A | 8/1981 | McWilliams | |
| 4,425,069 A | 1/1984 | Saur et al. | |
| 4,643,299 A | 2/1987 | Calundan | 198/812 |
| 4,813,526 A | 3/1989 | Bélanger | |
| 4,924,993 A | 5/1990 | Buxton | |
| 5,009,560 A | 4/1991 | Ruder et al. | |
| 5,307,917 A | 5/1994 | Hall | 198/313 |
| 5,351,809 A | 10/1994 | Gilmore et al. | |
| 5,403,142 A | 4/1995 | Stewart | |
| 5,423,413 A | 6/1995 | Gilmore | |
| 5,487,462 A | 1/1996 | Gilmore | |
| 5,568,857 A | 10/1996 | Chen et al. | |
| 5,642,803 A | 7/1997 | Tanaka | |
| 5,685,416 A | 11/1997 | Bonnet | 198/812 |
| 5,796,052 A | 8/1998 | Christmann | 177/145 |
| 6,006,893 A * | 12/1999 | Gilmore et al. | 198/588 |

OTHER PUBLICATIONS

International Search Report for PCT Application No. PCT/EP 97/01883 mailed Jul. 16, 1997.

Commonly assigned co–pending U.S. application Ser. No. 09/474,700, filed Dec. 29, 1999, entitled Extendable Conveyor with Additional Boom Section (P–584).

Commonly assigned co–pending U.S. application Ser. No. 09/618,689, filed on Jul. 18, 2000, entitled Extendable Gravity Loader (P–604).

Commonly assigned co–pending U.S. application Ser. No. 09/543,456, filed Apr. 5, 2000, entitled Extendable Trailer Loader/Unloader with User Interface Section (P–606).

* cited by examiner

EXTENDABLE TRAILER LOADER/UNLOADER WITH USER INTERFACE SECTION

This application claims the benefits of U.S. Provisional application Ser. No. 60/016,141, filed Apr. 24, 1996.

BACKGROUND OF THE INVENTION

This invention relates generally to conveyors and, more particularly, to extendable conveyors for loading products into, or unloading products from a truck trailer, or the like.

The loading and unloading of packages from truck trailers or the like is typically a physically challenging task. Given the often heavy weight of the packages loaded or unloaded, the cramped working area, and the repetitive lifting of these packages, the task may lead to injuries. With the high costs of labor and worker's compensation insurance, it is highly desirable to provide a machine which reduces both the potential of injuries to workers and the physical labor required to be exerted by the workers.

Extendable conveyors generally provide various benefits to the task of loading or unloading a truck trailer or the like. Of great benefit is the lengthwise extendable nature of the conveyor. By adjustably extending the conveying surface lengthwise, the amount of walking which workers have to perform between the conveyor end and the place where the articles or packages are stacked is reduced. The reduction in walking enables the trailer to be loaded or unloaded in less time and with greater efficiency. Furthermore, because the workers do not have to carry the articles being loaded or unloaded as great a distance, the potential for injuries while carrying possibly heavy articles is reduced.

Prior extendable conveyors, however, have not been without certain disadvantages. Longitudinal extendability places the operator interface closer to the work zone but does not take into account the lateral width of the trailer. Some prior extendable conveyors have designs which allow the extendable conveyor to be moved from side-to-side. This occurs about a pivot axis located outside the trailer truck. However, this requires that the entire length of the conveyor be moved laterally, which is complicated and may require a motor and costly sensing systems. Other examples, include load-out conveyors having an independently pivotable discharge conveyor that is supported on a wheeled vehicle. The wheeled vehicle, however, adds undesirable bulk to the working area and necessitates that the floor of the truck trailer be substantially flush with the floor of the loading dock.

Other difficulties with prior art extendable conveyors having pivotably mounted user interface sections is the inability of the user interface section to be fully retractable into the base unit. This lack of full retractability requires additional space at the loading dock which interferes with efficient operation.

From these examples, it can be seen that it would be highly desirable to provide an extendable conveyor which overcomes the disadvantages discussed above and others, and which has an improved ergonomic design that reduces the potential for worker injuries, and increases efficiency and productivity.

SUMMARY OF THE INVENTION

The present invention is intended to provide an extendable conveyor with improved ergonomic design that reduces the potential for injuries, lowers costs, and increases efficiency. An extendable conveyor for conveying articles between a particular location and a selectable variable location according to the present invention includes a mechanically extendable section supported in a cantilever fashion by a support structure. The mechanically extendable section is extendable along a longitudinal axis between a fully extended position extending forwardly from the support structure and a fully retracted position extending in an opposite direction. A horizontally adjustable user interface section is supported on said mechanically extendable section in a cantilever fashion. The user interface section is horizontally adjustable about the mechanically extendable section with respect to the longitudinal axis. The cantilever support of the boom and mechanically extendable section, along with the horizontal adjustability of the boom provide a greater ease of use of the extendable conveyor.

According to another aspect of the invention, an extendable conveyor for conveying articles between a particular location and a selectable variable location includes a base unit and one or more extendable conveyor units selectively nested within the base unit. The extendable conveyor units are each adjustably positionable incrementally between a fully nested position within the base unit and a fully extended position telescoped forwardly from the base unit. A user interface section is adjustably positionable between a fully nested position within the base unit and a fully extended position extending forwardly from the furthermost extendable one of the extendable conveyor units. The adjustable positionability of the user interface section allow the extendable conveyor to be retracted into a more compact space, thus freeing up space at the loading dock.

According to another aspect of the invention, an extendable conveyor for conveying articles between a particular location and a selectable variable location includes at least one extendable conveyor unit, a First conveying surface, and a user interface section having a carriage assembly and a boom. The carriage assembly is movably supported on a pair of extendable unit roller bars mounted to the forward end of the furthermost extendable of the extendable conveyor units. The boom has a second conveying surface and is pivotally mounted to the carriage assembly so as to be able to pivot horizontally with respect to the carriage assembly. The horizontal pivotability of the boom and the movability of the carriage assembly on the roller bars allow for a more efficient use of the extendable conveyor.

According to yet another aspect of the invention, an extendable conveyor for conveying articles between a particular location and a selectable variable location is provided which is supported at one end in a cantilever fashion by a support structure. The extendable conveyor further includes at least one extendable conveyor unit having a first conveying surface. The extendable conveyor units are selectively adjustable between a fully extended position extending forwardly from the support structure and a fully retracted position extending in an opposite direction. A carriage assembly is supported on one of the extendable conveyor units which is the furthermost extendable from the support structure. A boom having a second conveying surface is pivotally mounted to the carriage assembly so as to be both vertically and horizontally pivotable with respect to the longitudinal axis of the extendable conveyor units. A height adjustment mechanism adjusts the vertical height of the forward end of the boom and includes a plate mounted on either the boom or the carriage assembly. A shoe is mounted on the other of the boom or the carriage assembly. An actuator is provided for elevating the boom with respect to the plate or the shoe. This unique combination provides both horizontal and vertical adjustability of the boom, which allows the boom to be positioned closer to the work area thereby improving the efficiency of the extendable conveyor.

According to yet another aspect of the invention, an extendable conveyor includes a support structure and one or more extendable conveyor units adjustably positionable with respect to the support structure. The extendable conveyor units are positionable between a fully extended position and a fully retracted position. A user interface section is longitudinally movable with respect to the support structure and along the extendable conveyor unit which is the furthermost extendable from the support structure. An interlock system permits the extendable conveyor units to extend only when the user interface section is positioned on the furthermost extendable of the extendable conveyor units. The interlock system also prevents the user interface section from moving off of the furthermost extendable conveyor unit unless the furthermost extendable conveyor unit is in a fully retracted position. The user interface section can thus be moved to a user-desired location for efficient loading or unloading and can be retracted to a fully rested position within a base unit.

These and other objects, advantages and features of this invention will become apparent upon review of the following specification when read in conjunction with the accompanying drawings.

BRIEF DESCRIPTION OF THE DRAWINGS

FIG. 16 is an elevational view of extendable conveyor unit 24d;

FIGS. 17a–b are fragmentary, plan views of extendable conveyor unit 24d illustrating a cable retracting unit;

FIG. 18 is a sectional view taken along the line XVIII—XVIII in FIG. 17a;

DESCRIPTION OF THE PREFERRED EMBODIMENT

Figure 1:
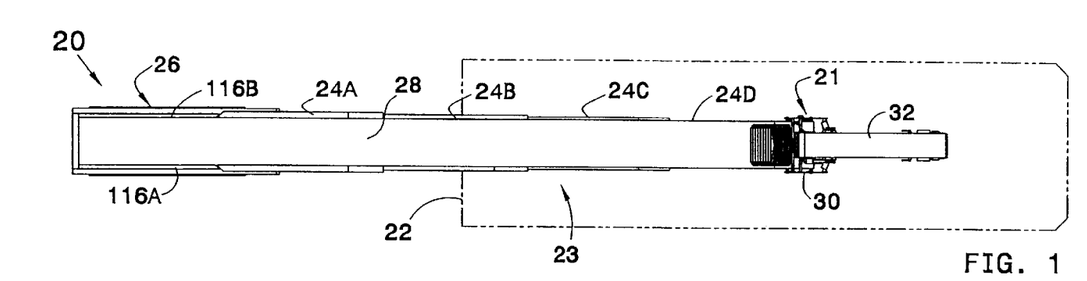
FIG. 1 is a plan view of an extendable conveyor according to the invention fully extended into a truck trailer.
Figure 2A:
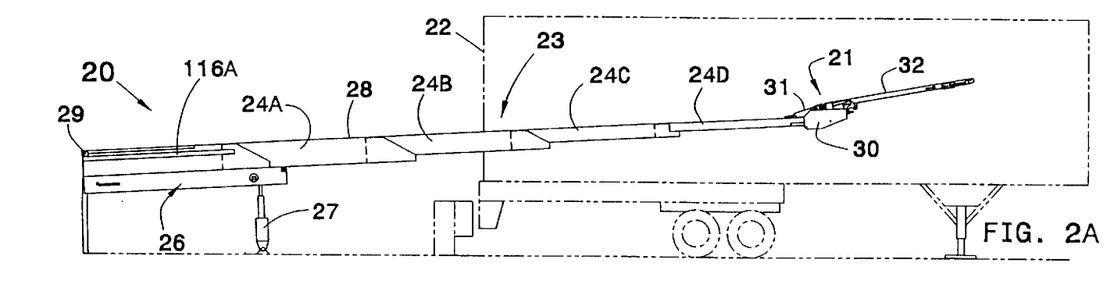
FIGS. 2a–b are side elevational views of the extendable conveyor in FIG. 1.
Figure 2B:
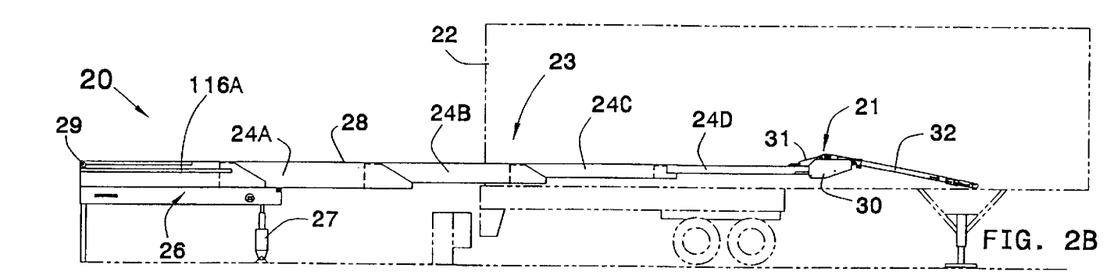

Referring now specifically to the drawings, and illustrative embodiments depicted therein, a multiple-stage extendable conveyor 20 extends from a feed or take-away conveyor (not shown) toward a selectable variable location, such as in a truck trailer 22, or the like (FIGS. 1–2). Extendable conveyor 20 includes a mechanical extendable section 23 and a user interface section 21 located at an end of mechanical extendable section 23 adjacent the selectable variable location. Extendable section 23 is supported in a cantilever fashion by a base unit 26, or other type of support structure, which may include a vertical actuator 27 capable of vertically pivoting extendable section 23 about a support pivot 29. Vertical actuator 27 may be pneumatic, hydraulic, or othewise mechanically powered as would be understood by one skilled in the art. Extendable section 23 may include one or more extendable conveyor units 24a–d. Extendable conveyor units 24a–d are movable with respect to each other in a telescoping fashion between a fully extended position (depicted in FIGS. 1–2) and a fully retracted position within base unit 26 (depicted in FIG. 13). The width of extendable conveyor unit 24b is slightly narrower than the width of extendable conveyor unit 24a, as is the width of extendable conveyor unit 24c with respect to extendable conveyor unit 24b, and likewise extendable conveyor unit 24d with respect to extendable conveyor unit 24c (FIG. 1). The progressively narrower widths of extendable conveyor units 24a–d allow extendable conveyor units 24a–d to be fully retracted essentially within and on top of each other. The details of extendable conveyor units 24a–d are disclosed in U.S. Pat. No. 5,351,809, the disclosure of which is hereby incorporated herein by reference and will not be repeated herein. Suffice it to say that the telescoping movement of extendable conveyor units 24a–d is motorized and under the control of a human operator. When the operator directs extendable section 23 to expand or retract, extendable conveyor units 24a–d will simultaneously expand or retract at controlled relative rates. Alternatively, the multiple-stage extendable conveyor may be of the type which is supported by a support structure other than a base unit, as is disclosed in U.S. Pat. No. 5,487,462, the disclosure of which is hereby incorporated herein by reference.

A conveying surface, such as a single endless belt 28 runs longitudinally along the length of extendable conveyor units 24a–d and is powered by a motor (not shown). Belt 28 is reeved through base unit 26 and extendable conveyor units 24a–d in such a way so that excess slack is taken up as mechanically extendable section 23 retracts rearwardly and additional belt length is provided as mechanically extendable section 23 extends forwardly as is well known in the art. For purposes of description, the term "rearwardly" will be used to designate the direction pointing toward the support structure or base unit, and the term "forwardly" will be used to describe the opposite direction pointing toward the selectable variable location. However, the use of such terms is not intended to be limiting unless so specified. The reeving of belt 28, and the manner in which it expands or retracts in accordance with the varying length of extendable conveyor 20 is also disclosed in the above referenced U.S. Pat. No. 5,351,809. Other conveying surfaces, such as, for example, powered or gravity rollers may be used. Such powered conveying surfaces may be powered rearwardly for an unloading extendable conveyor or forwardly for a loading extendable conveyor.

Figure 3:
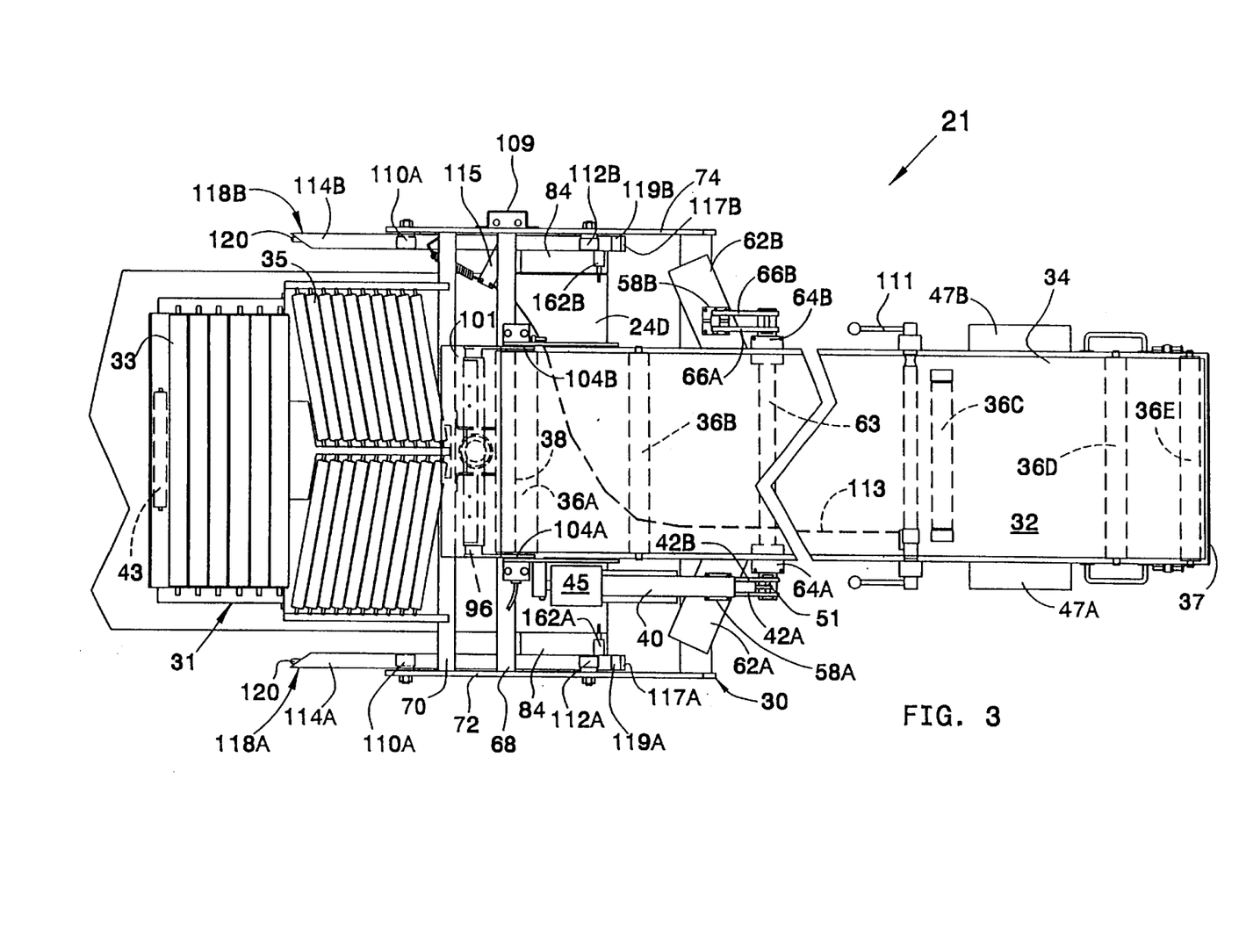
FIG. 3 is a plan view of a user interface section of the extendable conveyor.
Figure 4:
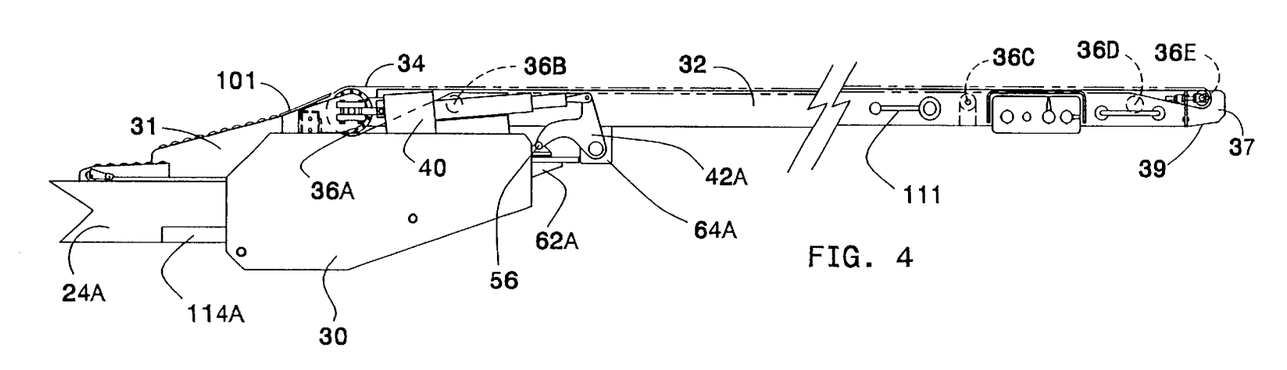
FIG. 4 is a side elevational view of the user interface section of the extendable conveyor.

User interface section 21 includes an adjustable boom 32 which is pivotally mounted to, and supported by, a carriage assembly 30. Carriage assembly 30 is supported in a cantilever fashion on the furthermost extendable conveyor unit 24d. A roller assembly 31 extends rearwardly from carriage assembly 30 in order to provide a surface interface between boom 32 and extendable conveyor unit 24d (FIGS. 3–4). Roller assembly 31 includes a rear set of rollers 33 and an adjacent forward set of rollers 35 which slopingly ascend toward boom 32. Rear set of rollers 33 are slidable underneath forward set of rollers 35 when carriage assembly 30 is retracted fully rearward on base unit 26. A support roller 43 rides directly on conveyor belt 28 and rearwardly supports roller assembly 31 (FIG. 3). It will be appreciated by those skilled in the art that a variety of differently configured roller assemblies which bridge boom 32 with conveyor belt 28 may alternatively be used.

Figure 5:
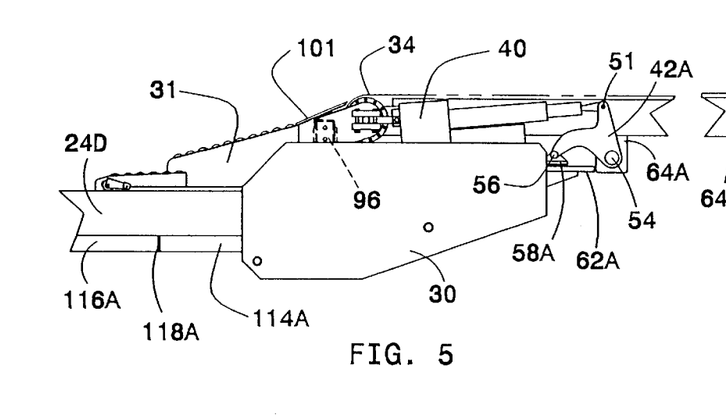
FIG. 5 is an enlarged view of the area designated V in FIG. 4.
Figure 6:
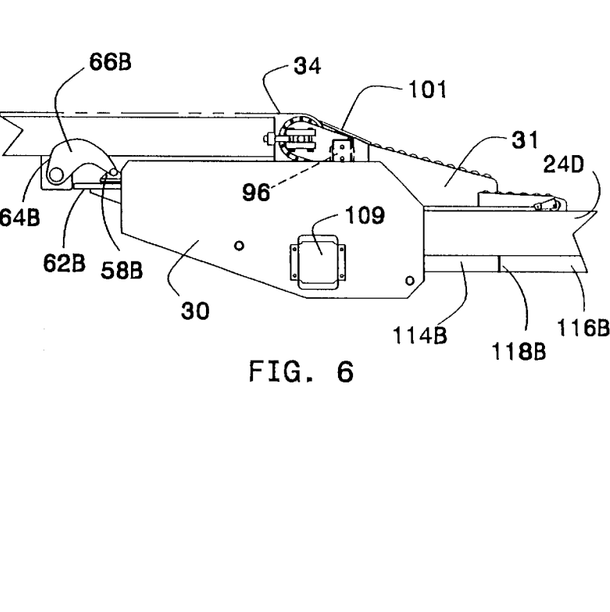
FIG. 6 is the same view as FIG. 5 from the opposite side of the conveyor.

Boom 32 includes an endless belt 34 reeved around a set of rollers defining a conveying surface 41 (FIGS. 3–5). Roller 36a is motorized and powers the movement of belt 34 in either direction depending upon whether extendable conveyor 20 is being used for loading or unloading. Roller 36a defines a horizontal pivot axis 38 about which boom 32 pivots vertically, as will be described below. Boom belt 34 is reeved around roller 36a, rides on top of roller 36b, c, d, and is reeved around forward roller 36e. Boom 32 includes two control panels 47a, 47b mounted on either side of boom 32 which enable a user to operate extendable conveyor 20 from user interface section 21. An endpiece 37 of boom 32 has an angled, bottom edge 39 which is adapted to rest substantially flush against the floor when boom 32 is lowered downward. Endpiece 39 also prevents belt 34 from rubbing against the floor when boom 32 is lowered to the floor. In the preferred embodiment endpiece 39 is made of steel in order to withstand the stresses of repeated bumping against the floor.

Boom 32 is vertically adjustable about a horizontal pivot axis 38 between an upper and lower limit by way of a height adjustment mechanism 45. Height adjustment mechanism 45 includes a pair of shoes 58a, 58b, attached in the illustrated embodiment to boom 32 and each slidably resting on a winged platform, or plate, 62. Plates 62 are in the illustrated embodiment to carriage assembly 30. Height adjustment mechanism 45 further includes an actuator for extending the boom with respect to the shoe/platform interface. The actuator is made up of a linear motor 40, longitudinally extendable in a piston-like fashion between a fully extended position and a fully retracted position. Electric actuator 40 powers the vertical movement of boom 32 between the upper and lower limits. Electric actuator 40 is rotatably secured at its forward end to two triple-pronged lever members 42a–b by a pin 51, or the like, inserted through a circular aperture in one of the prongs of the triple-pronged lever members 42a–b. Triple-pronged lever members 42a–b additionally include apertures 54a–b and 56a–b adjacent the ends of each of the remaining two prongs. Apertures 56a–b are used in conjunction with a pin, or the like, to rotatably secure the prongs to a shoe 58a. Shoe 58a slidably rests on a winged platform, or plate, 62a extending forwardly from carriage assembly 30. Apertures 54a and 54b are used to rigidly secure triple-pronged lever members 42a–b to a torque bar 63 secured underneath boom 32 by attachment bearings 64a–b attached at opposite sides of boom 32 (FIG. 3). Torque bar 63 is secured at an end opposite triple-pronged lever members 42a–b to two double-pronged lever members 66a–b. Double-pronged lever members 66a–b are rotatably connected at the other prong to a shoe 58b. Winged platform 62b is substantially symmetrical to winged platform, or plate, 62a. To facilitate the sliding of shoes 58a–b on winged platforms 62a–b, it is preferred that the top surface of winged platforms 62a–b be defined with a low-friction surface, such as one defined by a plastic material, and that the bottom surfaces of shoes 58a–b be covered with a different plastic material. In the illustrated embodiment, the bottom surface of shoes 53a–b is a mixture of nylon and teflon, and the plastic top surface of winged platforms 62a–b is ultra-high molecular weight (UHMW) polypropylene or polyethylene. It will be appreciated by one skilled in the art that height adjustment mechanism 45 may be alternately constructed with platforms 62a–b positioned on boom 32 and shoes 58a–b gliding along the underside of plates 62a–b. Other low-friction surfaces such as wheels or balls may also be used.

Figure 19A:
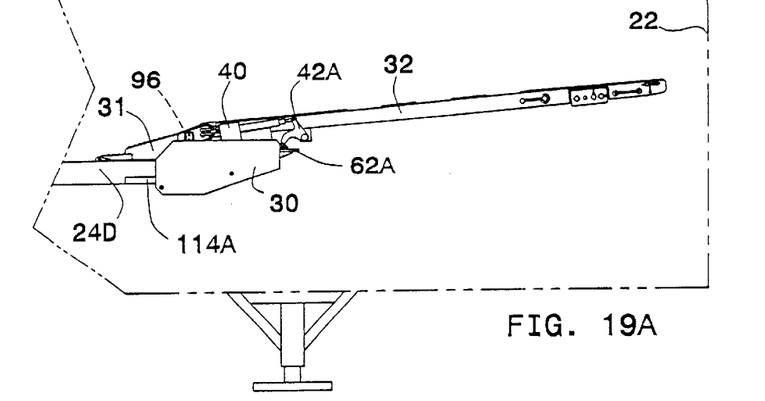
FIGS. 19a–c are elevational views of the user interface section illustrating the vertical pivoting of the boom.
Figure 19B:
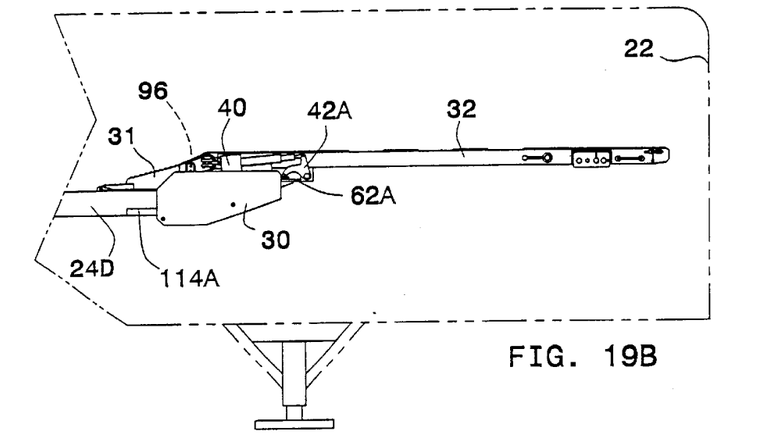
Figure 19C:
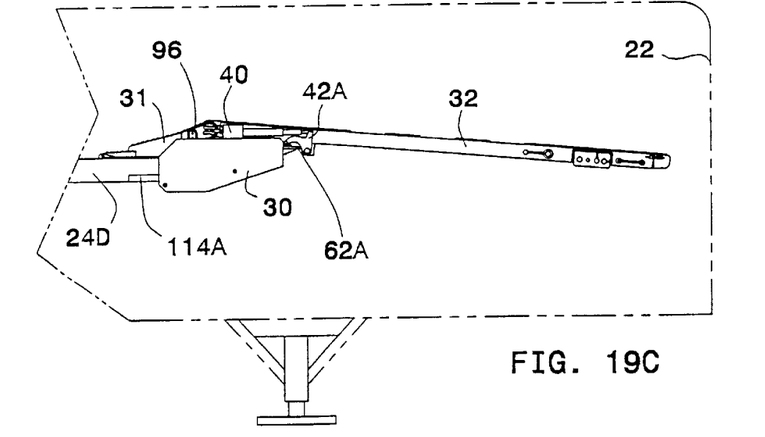

When a user directs boom 32 to pivot to a lower position via control panel 47, electric actuator 40 is activated and increases in length in a piston-like fashion thereby exerting a torque on triple-pronged lever members 42a–b in a clockwise direction (as seen in FIG. 5). The clockwise rotation of triple-pronged lever members 42a–b moves triple-pronged apertures 54a–b to a lower elevation, altering the vertical distance between platforms 62a–b and boom 32 and thereby moving boom 32 to a lower elevation (See FIG. 19c). The torque exerted on triple-pronged lever members 42a–b by electric activator 40 will be transferred via torque bar 63 to double-pronged lever members 66a–b. Double-pronged lever members 66a–b will therefore likewise rotate on the opposite side of boom 32 and boom 32 will consequently be lowered and supported evenly on both of its sides. Boom 32 will pivot about horizontal axis 38. When a user directs boom 32 to pivot to a higher position via control panel 47, electric actuator 40 is activated and decreases in length in a piston-like fashion, thereby rotating tripled pronged lever members 42a–b counterclockwise. Double-pronged lever members 66a–b will also be rotated via torque bar 63, and together they will raise boom 32 by pushing against winged platforms 62a–b (See FIGS. 19a–b). The vertical pivoting of boom 32 with respect to carriage assembly 30 is limited to a lower and upper limit. When an operator directs boom 32 via control panel 47 to pivot to a vertical height greater than the upper limit of boom 32 the control circuitry for extendable conveyor 20 will activate vertical actuator 27 so that the entire conveyor will pivot upward about support pivot 29 as seen in FIG. 2a. Likewise, when an operator directs boom 32 to pivot to a lower position after boom 32 has reached its lower limit, the control circuitry for extendable conveyor 20 will activate vertical actuator 27 so that the entire conveyor will pivot downward about support pivot 29 as seen in FIG. 2b.

Figures 7, 8, 9, 10, 11, 12:
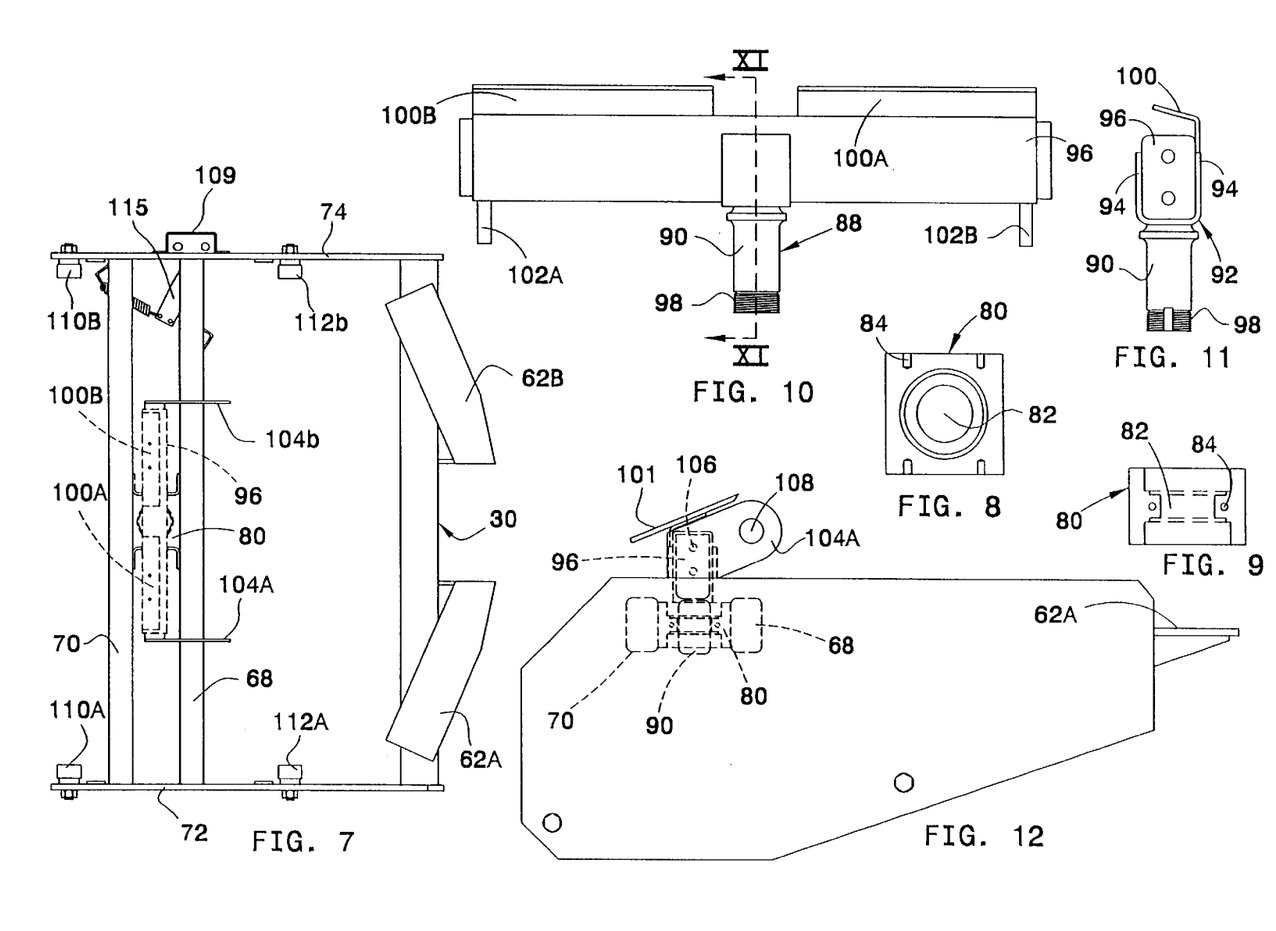
FIG. 7 is a plan view of a carriage assembly with a pivot bar attached.
FIG. 8 is an enlarged plan view of a tapered roller bearing member.
FIG. 9 is an elevational view of the tapered roller bearing member in FIG. 8.
FIG. 10 is a front elevational view of a vertical pivot and pivot bar.
FIG. 11 is a sectional view taken along the line XI—XI in FIG. 10.
FIG. 12 is a side elevational view of the carriage assembly with the pivot-bar and an inclined bridge attached.
Figure 20A:
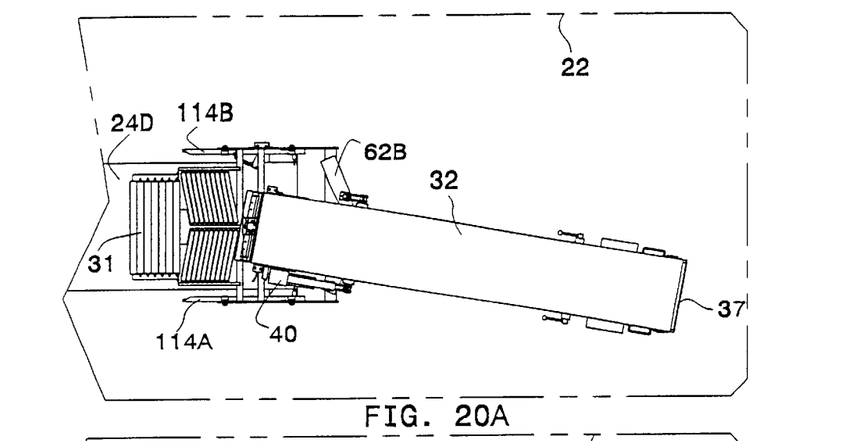
FIGS. 20a–c are plan views of the user interface section illustrating the horizontal pivoting of the boom.
Figure 20B:
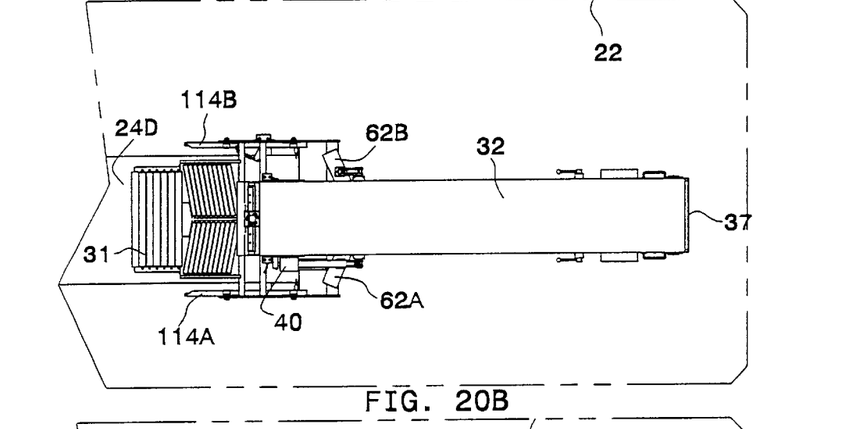
Figure 20C:
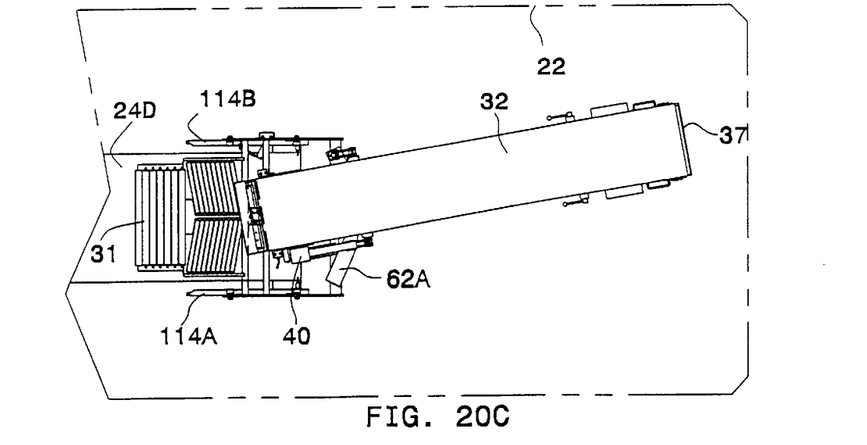

Boom 32 is also manually, horizontally pivotable from side to side with respect to carriage assembly 30, as can be seen by comparing FIGS. 20a–c. Carriage assembly 30 includes a forward crossbar 68 and a rear crossbar 70 extending substantially parallel to each other and laterally between carriage assembly sides 72 and 74 (FIG. 7). Two "U" shaped supports 76a–b are secured midway to crossbars 68 and 70. Supports 76a–b are welded, or otherwise securely fastened, at their ends to crossbars 63 and 70. A tapered roller bearing member 80 is secured between "U" shaped supports 76a–b by four screws 78a–d, or the like, which are inserted in pairs through apertures in supports 26a–b into tapered roller bearing member 80. Tapered roller bearing member 80 includes-a central, circular, vertical bore which defines a vertical bearing 82 (FIGS. 8 and 9). A vertical shaft 88, which defines the pivot axis of boom 32 is inserted through vertical bearing 82 (FIGS. 10–12). When boom 32 is pivoted horizontally, vertical shaft 88 rotates in tapered roller bearing member 80. Shoes 58a–b slide along winged platforms, or plates 62a–b, thereby enabling lever members 42a–b and 66a–b to support boom 32 on platforms 62a–b at a desired location while boom 32 is pivoted horizontally.

Vertical shaft 88 includes a cylindrical body portion 90 and a "U" shaped rectangular head portion 92. "U" shaped rectangular head portion 92 is made up of two arms 94 between which a pivot bar 96 is welded, or otherwise securely fastened. At a lower end of vertical shaft 88 are external threads 98 which are adapted to receive and secure a nut (not shown) to vertical shaft 88 after insertion through vertical bearing 82. Vertical shaft 88 and pivot bar 96 are free to rotate within vertical bearing 82 of tapered roller bearing member 80 while the nut secured on external threads 98 secures vertical shaft 88 in tapered roller bearing member 80. Two downwardly extending posts 102a–b attached at opposite ends of pivot bar 96 limit the angular movement of pivot bar 96 by contacting crossbars 68 and 70 at the angular extremes (FIG. 10). Two inclined bridge supports 100a–b are securely fastened to pivot bar 96, by welding or otherwise. Inclined bridge supports 100a–b support an inclined bridge 101 which serves to further bridge the gap in the conveying surface between boom belt 34 and roller assembly 31 (FIG. 12). Securely fastened to each end of pivot bar 96 is a mounting 104 which is secured to pivot bar 96 by two screws 106 or the like. A circular aperture 108 is defined in each mounting plate 104a–b in order to support axis 38 of roller 36a. Axis 38 of roller 36a also forms the horizontal pivot axis for vertical pivoting of boom 32, as described above.

Figure 13:
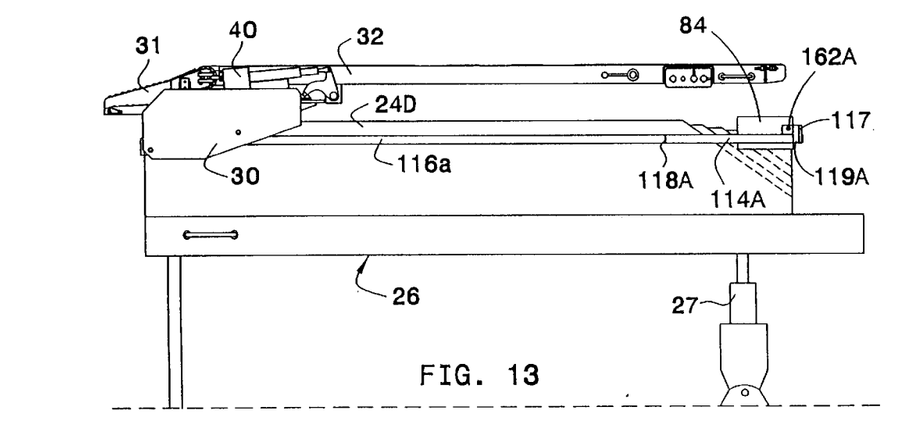
FIG. 13 is a side elevational view of the extendable conveyor illustrating the user interface section fully retracted in the base unit.
Figure 14:
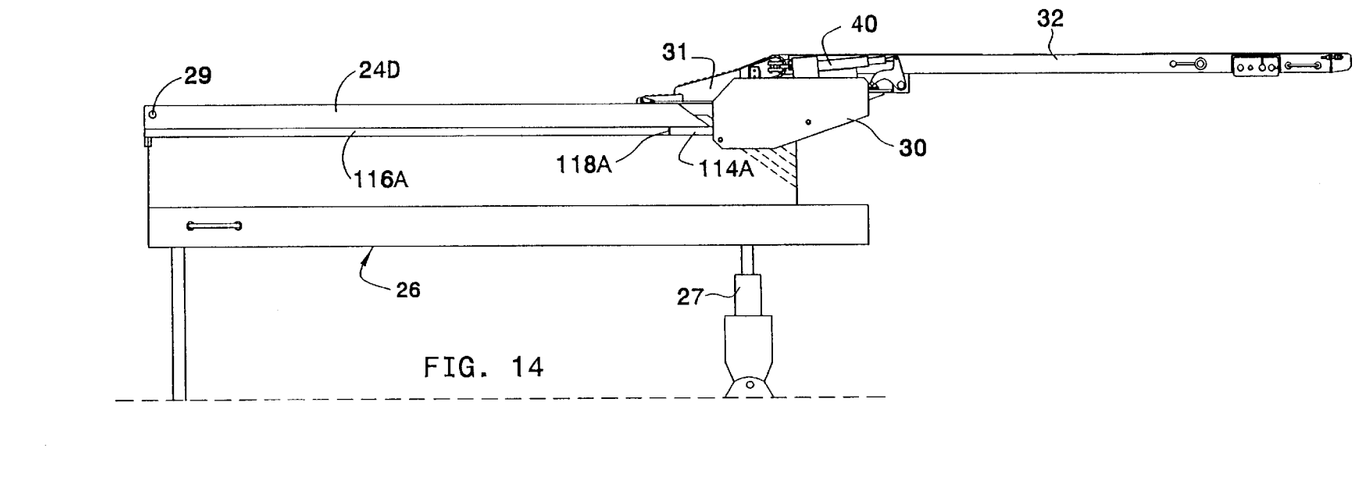
FIG. 14 is the same view as FIG. 13 illustrating the user interface section at a forward end of the base unit.

Carriage assembly 30 is supported for longitudinal movement along extendable conveyor unit 24d by a pair of rearward support rollers 110a–b and a pair of forward support rollers 112a–b secured to carriage assembly sides 72 and 74 (FIG. 3). Support rollers 110a–b and 112a–b manually roll along a pair of longitudinally oriented, substantially parallel, extendable conveyor unit roller bars, or support rails, 114a–b which are attached to extendable conveyor unit 24d. Extendable conveyor unit roller bars 114a–b extend along only a forward portion of extendable conveyor unit 24d. In the illustrated embodiment, extendable conveyor unit roller bars 114a–b are each secured to extendable conveyor unit 24d by way of a connection bar 84 welded, or otherwise securely fastened, to the forward end of roller bars 114a–b and extendable conveyor unit 24d. Another pair of longitudinally oriented, substantially parallel, base roller bars, or support rails, 116a–b are attached to base unit 26 (FIGS. 13 and 14). When extendable conveyor unit 24d has been retracted into base unit 26, extendable conveyor unit roller bars 114a–b will contact base roller bars 116a–b and form an essentially continuous pair of collinear rolling surfaces for support rollers 110a–b and 112a–b. When extendable conveyor unit 24d is not retracted onto base unit 26, but is extended forwardly therefrom, extendable conveyor unit roller bars 114a–b will be disconnected from base roller bars 116a–b (See FIGS. 1–2). Carriage assembly 30 is prevented from rolling forwardly off of roller bars 114a–b by fixed stops 117a–b secured by screws or the like to the forward ends of roller bars 114a–b. A strip of neoprene rubber 119 is attached on the rearward side of each static forward interlock 117 to cushion impacts of forward support rollers 112a–b with forward interlocks 117. In the illustrated embodiment, support rollers 110a–112b are defined by cam-followers.

The range of movement of carriage assembly 30, and thus user interface section 21, on extendable conveyor unit roller bars 114a–b and base roller bars 116a–b is controlled by a system of interlocks. The interlock system includes a forward set of electrical interlocks 162a–b on a forward end of extendable conveyor unit 24d adjacent forward stops 117a–b (FIG. 3). The interlock system also includes a rearward set of mechanical interlocks 118a–b located at the rearward end of extendable conveyor unit roller bars 114a–b. Forward interlocks 162a–b permit extendable conveyor units 24a–d to extend only when user interface section 30 is positioned on extendable conveyor unit roller bars 114a–b. Rearward interlocks 118a–b prevent user interface section 21 from moving rearwardly off of extendable conveyor unit roller bars 114a–b unless extendable conveyor unit 24d is in a fully retracted position. Thus, when extendable conveyor 20 is in a fully retracted position, user interface section 21 is movable along both extendable conveyor unit roller bars 114a–b and base roller bars 116a–b. The details of forward and rearward interlocks 162 and 118 are described below.

Figure 15A:
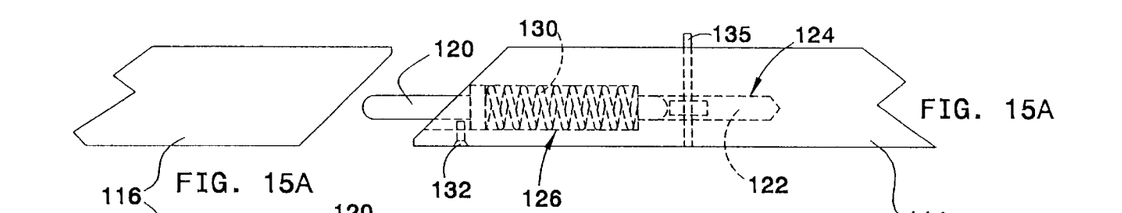
FIG. 15a is a fragmentary, plan view of an automatic stop mechanism in a stopped position.
Figure 15B:
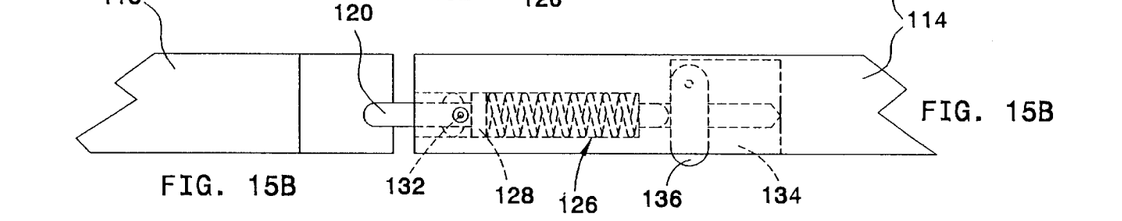
FIG. 15b is a fragmentary, elevational view of the automatic stop mechanism in a stopped position.
Figure 15C:
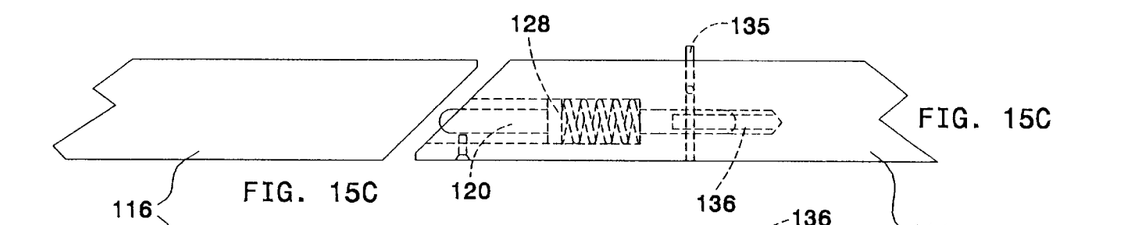
FIG. 15c is a plan view of the automatic stop mechanism in a non-stopping position.
Figure 15D:
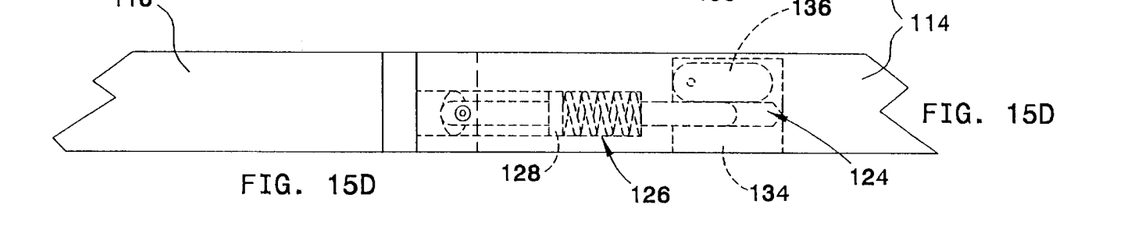
FIG. 15d is a fragmentary, elevational view of the automatic stop mechanism in a non-stopping position.

Each rear mechanical interlock 118a–b includes a contact pin 120 slidably inserted into a longitudinally extending bore 122 in roller bar 114 (FIGS. 15a–d). Longitudinal bore 122 includes an innermost section 124 of reduced diameter and an outermost section 126 of enlarged diameter. A rim 128 on contact pin 120 has a circumference slightly smaller than the enlarged circumference of outermost section 126 and is adapted to slide longitudinally within outermost section 126. Rim 128 engages and retains a spring 130 within outermost section 126 of longitudinal bore 122. A retainer screw 132 is inserted into roller bar 114 perpendicularly to longitudinal bore 122 and protrudes partially into longitudinal bore 122 adjacent its opening. Retainer screw 132 prevents contact pin 120 and spring 130 from being removed from longitudinal bore 122 by obstructing and preventing rim 128 from moving past. A stop lever 136 is housed in a recessed area 134 partially surrounding a portion of innermost section 124 of longitudinal bore 122. Stop lever 136 is pivotally secured to roller bar 114 at an end located above longitudinal bore 122. Stop lever 136 rotates on an axis pin 135. When extendable conveyor unit roller bar 114 abuts against base roller bar 116, contact pin 120 is pushed into longitudinal bore 122 and rotates stop lever 136 upwardly (FIGS. 15c–d). When stop lever 136 is rotated upwardly by contact pin 120, roller 110 is free to roll along bottom surface 138 of roller bar 114 and may freely roll onto bottom surface 140 of abutting base roller bar 116. When base roller bar 116 does not abut roller bar 114, spring 130 partially pushes contact pin 120 out of longitudinal bore 122 until rim 128 contacts retainer screw 132 (FIGS. 15a–b). When contact pin 120 is pushed out of longitudinal bore 122 in this fashion, stop lever 136 is rotated downwardly by the force of gravity and stops rear support roller 110 from moving past it along bottom surface 138. In this fashion, rear interlocks 118 automatically allow carriage assembly 30 to roll from base roller bars 116 to extendable conveyor unit roller bars 114 only when base roller bars 116 are in abutting contact with extendable conveyor unit roller bars 114.

Electrical forward interlocks 162a–b are proximity sensors which detect the presence of carriage assembly 30 when it has been rolled all the way forward on roller bars 114a–b of extendable conveyor unit 24d and permit activation of the electric motor which extends the extendable units. In the preferred embodiment, proximity sensors 162a–b are sensors sold by the Allen Bradley Company and having the part number 872C-A10N18-R3. The detection of the presence of carriage assembly 30 by proximity sensors 162a–b results in an electrical signal being sent to the control circuitry (not shown) of extendable conveyor 20. The control circuitry will only allow the extension of extendable conveyor units 24a–d after the presence of carriage assembly 30 has been detected and a user has directed extendable conveyor 20 to extend out further. By the combination of the automatic extension of extendable conveyor units 24a–d and the manual sliding of carriage assembly 30 on base unit 26 and extendable conveyor unit 24d, the longitudinal position of boom 32 can be selectively adjusted to any location between a fully retracted position and a fully extended position. Carriage assembly 30 is selectively prevented from rolling along roller bars 144a–b and base roller bars 116a–b when carriage assembly 30 is in a desired location by a brake mechanism 109 (FIG. 3). Brake mechanism 109 is attached to side 74 of carriage assembly 30 between rollers 110b and 112b. Brake mechanism 109 is defined by a caliper-type brake pad assembly, or the like, which selectively and securely grips roller bar 144b or base roller bar 116b, depending upon the current position of carriage assembly 30. The brake pads grip roller bars 144b or 116b securely enough to prevent carriage assembly 30 from rolling. Brake mechanism 109 is activated and deactivated by a user by way of a brake handle 111 positioned forwardly of carriage assembly 30 on boom 32. Turning brake handle 111 activates or deactivates brake mechanism 109 via a brake cable 113 extending between the two. In particular, turning brake handle 111 either increases or decreases the tension on brake cable 113 which turns a brake lever 115. Brake lever 115 in turn activates the brake pads of brake mechanism 109 when turned in one direction and deactivates the brake pads of brake mechanism 109 when turned in the opposite direction. Preferably, a biasing mechanism biases the brake lever in a position which engages the brakes. As will be appreciated by those skilled in the art, a variety of different types of brakes may be used with the present invention.

Figures 16, 17A, 18:
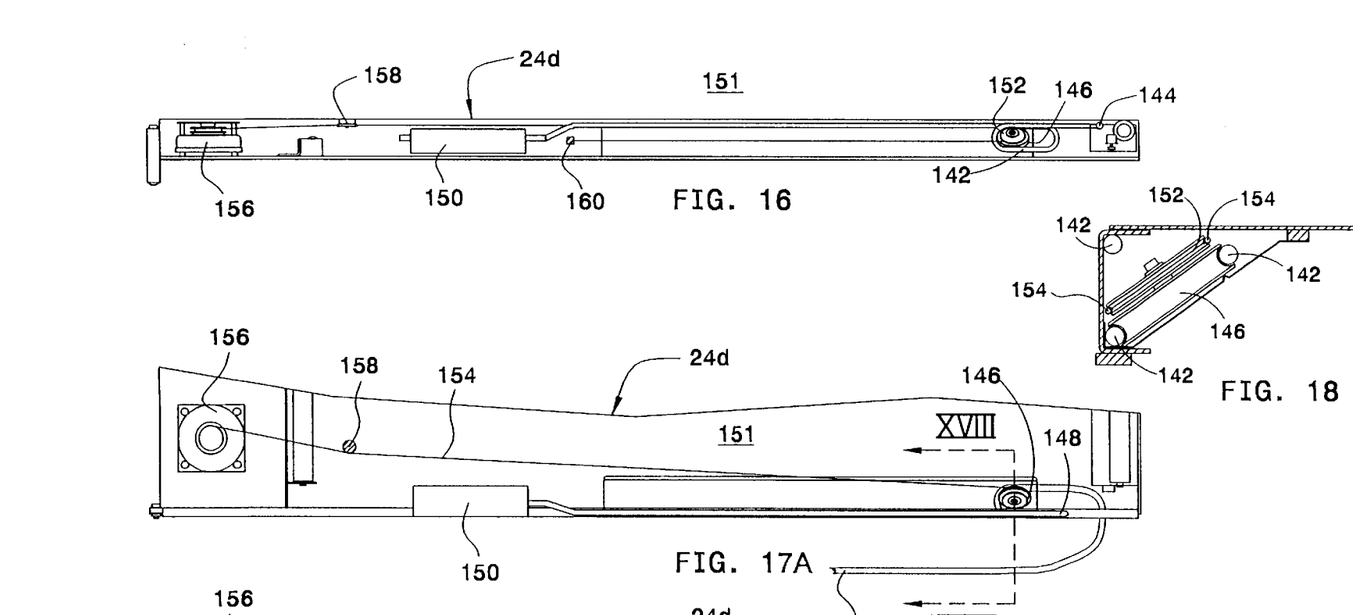
Figure 17B:
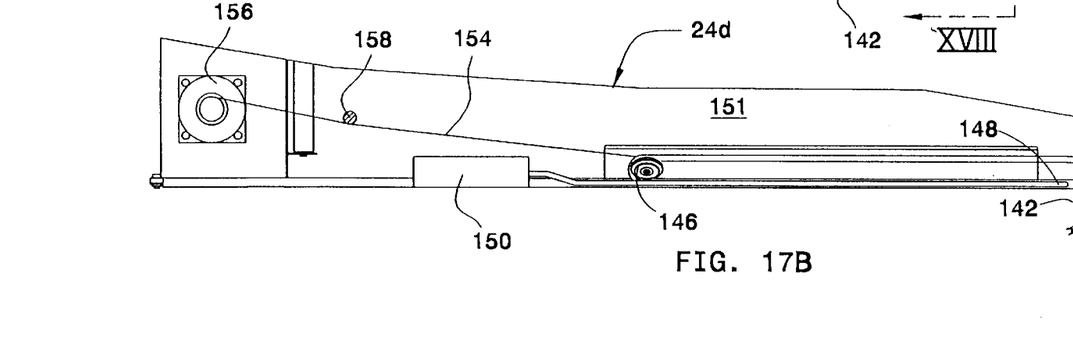

Electrical power is supplied to control panels 47a, 47b, and other electrical components of user interface section 21 by means of a cable 142 extending from extendable conveyor unit 24d to user interface section 21. A cable retracting unit 151 releases cable 142 when carriage assembly 30 is extended forwardly and retrieves excessive cable length when carriage assembly 30 is extended rearwardly (FIGS. 16, 17a–b). Cable 142 is threaded through a hole 144 in a side of extendable conveyor unit 24d adjacent the forward end of extendable conveyor unit 24d. Cable 142 wraps partially around a longitudinally slidable sheave 146, extends forwardly to attachment point 148 on a side of extendable conveyor unit 24d, and thereafter extends rearwardly along the side of the extendable conveyor unit 24d to electrical box 150. Sheave 146 is longitudinally slidable along a portion of the side of extendable conveyor unit 24d extending from a rear position adjacent electrical box 150 to forward position adjacent attachment point 148. Attached concentrically on top of sheave 146 is a smaller tension sheave 152 (FIG. 18). A tension wire 154 extends forwardly from a tension reel 156, which may be a spring motor or the like, passes along guidance sheave 158, continues forwardly and wraps approximately semi-circularly around tension sheave 152, and then continues rearwardly back to a wire attachment point 160 adjacent electrical box 150. Tension reel 156 continuously exerts a tension force on tension wire 154 which in turn exerts a rearward force on slidable sheaves 152 and 146. The force of the tension on slidable sheaves 146 and 152 is such that the slidable sheaves are pulled rearwardly when excess cable 142 is generated by the rearward sliding of carriage assembly 30 on extendable conveyor unit 24d (FIG. 17b). The tension created by tension reel 156, however, is small enough so that sheaves 146 and 152 are pulled forwardly when carriage assembly 30 is moved forwardly with respect to extendable conveyor unit 24d and extra cable length is required (FIG. 17a). Cable retracting unit 151 thus simply and effectively eliminates slack in cable 142, regardless of where carriage assembly 30 is positioned on extendable conveyor unit 24d.

While the invention has been depicted in the attached drawings in the embodiment of an extendable unloading conveyor, it will be understood by those skilled in the art that the present invention finds equal applicability to extendable loading conveyors. Other modifications may also be made within the scope of the present invention including, for example, the substitution of rollers for either or both the conveyor belt 28 and the boom belt 34.

Additional changes and modifications in the specifically described embodiments can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. An extendable conveyor for conveying articles between a particular location and a selectable variable location, comprising:

a support structure;

a mechanically extendable section which is extendable along a longitudinal axis between a fully retracted position and a fully extended position, said mechanically extendable section supported in a cantilever fashion by said support structure, said mechanically extendable section having a conveying surface; and, a user interface section which is horizontally adjustable with respect to said longitudinal axis of said extendable section, wherein said user interface section is supported in a cantilever fashion by said mechanically extendable section.

2. The extendable conveyor of claim 1 wherein said user interface section is also vertically adjustable with respect to said mechanically extendable section.

3. The extendable conveyor of claim 2 wherein said user interface section is vertically adjustable between an upper and a lower limit and said mechanically extendable section is vertically upwardly adjustable after said user interface section has been adjusted to said upper limit and is vertically adjustable downwardly after said user interface section has been extended to said lower limit.

4. The extendable conveyor of claim 3 wherein said user interface section and said mechanically extendable section are vertically adjustable by mechanical power.

5. The extendable conveyor of claim 3 wherein said user interface section and said mechanically extendable section can vertically adjust said user interface section to be in contact with a floor defined in said selectable variable location.

6. The extendable conveyor of claim 1 wherein said user interface section is longitudinally movable along said mechanically extendable section when said mechanically extendable section is fully retracted.

7. The extendable conveyor of claim 6 wherein said user interface section is manually movable along said mechanically extendable section when said mechanically extendable section is fully retracted.

8. The extendable conveyor of claim 1 wherein said user interface section is longitudinally movable only along a portion of said mechanically extendable section when said mechanically extendable section is extended.

9. The extendable conveyor of claim 6 wherein said mechanically extendable section is extendable between a fully extended position and a fully retracted position only when said user interface section has been moved adjacent a forward end of said mechanically extendable section.

10. The extendable conveyor of claim 1 wherein the horizontal adjustability of said user interface section is manually powered.

11. The extendable conveyor of claim 1 wherein said support structure is a base unit and said user interface section can be retracted into said base unit.

12. The extendable conveyor of claim 1 wherein said user interface section includes a conveying surface.

13. The extendable conveyor of claim 1 wherein said user interface section is vertically adjustable with respect to said longitudinal axis of said extendable section and including an actuator for vertically adjusting said user interface section with respect to said longitudinal axis of said extendable section.

14. The extendable conveyor of claim 13 wherein said actuator comprises a linear actuator.

15. The extendable conveyor of claim 13 wherein said actuator comprises an electric motor.

16. The extendable conveyor of claim 13 wherein said actuator actuates in a substantially horizontal direction.

17. The extendable conveyor of claim 13 wherein said actuator is pivotally attached at a first point at one end of a lever, said lever pivoted at a second pivot point at an opposite end of said lever, wherein an axis passing through said pivot points is generally perpendicular to the direction of activation of said actuator.

18. The extendable conveyor of claim 13 including an operator control panel on said user interface section that operates said actuator.

19. The extendable conveyor of claim 1 wherein said user interface section has another conveying surface.

20. The extendable conveyor of claim 19 wherein said conveying surface and said another conveying surface define a substantially continuous trailer loading conveying surface.

21. The extendable conveyor of claim 19 wherein said conveying surface and said another conveying surface define a substantially continuous trailer unloading conveying surface.

22. The extendable conveyor of claim 19 wherein said conveying surface comprises a conveyor belt and said another conveying surface comprises a conveyor belt.

23. The extendable conveyor of claim 22 wherein said conveying surface and said another conveying surface comprise separate conveyor belts.

24. The extendable conveyor of claim 1 wherein said conveying surface comprises rollers.

25. The extendable conveyor of claim 1 wherein said mechanically extendable section comprises a plurality of extendable conveyor units and wherein said user interface section is supportable from an outermost one of said plurality of extendable conveyor units.

26. The extendable conveyor of claim 1 wherein said conveying surface is a trailer loading conveying surface.

27. The extendable conveyor of claim 1 wherein said conveying surface is a trailer unloading conveying surface.

28. The extendable conveyor of claim 1 including a support base supportable at a forward end of said mechanically extendable section and at least one movable support supported by said support base, wherein said moveable support supports said user interface section as said user interface section is horizontally adjusted about a substantially vertical axis.

29. The extendable conveyor of claim 28, wherein said at least one movable support supports said user interface section forward of said substantially vertical axis.

30. The extendable conveyor of claim 29, wherein said at least one movable support is selected from the group consisting of shoes, wheels and balls.

31. The extendable conveyor of claim 30, wherein said support base includes a support surface, said at least one movable support movably engaging said support surface as said user interface section is horizontally adjusted.

32. The extendable conveyor of claim 28, wherein said at least one movable support is selected from the group consisting of shoes, wheels and balls.

33. The extendable conveyor of claim 28 wherein said user interface section is vertically adjustable about a substantially horizontal axis and including an actuator for vertically adjusting said user interface section about said substantially horizontal axis.

34. The extendable conveyor of claim 1 including a first frame which is supportable by said mechanically extendable section at said forward end of said mechanically extendable section;

a second frame supporting said user interface section from said first frame, said second frame being pivotable with respect to said first frame about a generally vertical axis to provide horizontal adjustability of said user interface section with respect to said first frame and said mechanically extendable section within a range of horizontal adjustability; and at least one item selected from the group consisting of shoes, wheels and balls between said first frame and said second frame to provide cantilever support of said user interface section throughout said range of horizontal adjustability.

35. The extendable conveyor of claim 34 wherein said user interface section is pivotable with respect to said second frame about a generally horizontal axis to provide vertical adjustability of said user interface section with respect to said extendable conveyor section; and further including an actuator which is operable to vertically adjust said user interface section about said generally horizontal axis.

36. The extendable conveyor of claim 34, wherein said at least one item is positioned forward of said generally vertical axis.

37. The extendable conveyor of claim 34 wherein said user interface section has another conveying surface.

38. The extendable conveyor of claim 37 wherein said conveying surface and said another conveying surface define a substantially continuous trailer loading conveying surface.

39. The extendable conveyor of claim 37 wherein said conveying surface and said another conveying surface define a substantially continuous trailer unloading conveying surfaces.

* * * * *